United States Patent
Hirayama et al.

(10) Patent No.: US 6,726,988 B2
(45) Date of Patent: Apr. 27, 2004

(54) MAGNETIC RECORDING MEDIUM

(75) Inventors: Hitoshi Hirayama, Tokyo (JP); Masao Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/108,380

(22) Filed: Mar. 29, 2002

(65) Prior Publication Data

US 2002/0172841 A1 Nov. 21, 2002

(30) Foreign Application Priority Data

Apr. 5, 2001 (JP) ........................... 2001-106784

(51) Int. Cl.$^7$ ............................. G11B 5/73; G11B 5/725
(52) U.S. Cl. ................... 428/336; 428/458; 428/474.4; 428/694 SL; 428/694 TF
(58) Field of Search ..................... 428/694 SL, 216, 428/458, 474.4, 336, 694 TF

(56) References Cited

U.S. PATENT DOCUMENTS 6,096,419 A * 8/2000 Ito et al. ................... 428/336
6,180,254 B1 1/2001 Handa et al. ............. 428/474.4

FOREIGN PATENT DOCUMENTS

| JP | 11-213370 | 8/1999 |
|----|-----------|--------|
| JP | 11-213372 | 8/1999 |
| JP | 11-213373 | 8/1999 |
| JP | 11-213374 | 8/1999 |
| JP | 2000-302896 | 10/2000 |

* cited by examiner

Primary Examiner—Stevan A. Resan
(74) Attorney, Agent, or Firm—Oblon, Spivak, McClelland, Maier & Neustadt, P.C.

(57) ABSTRACT

A magnetic recording medium comprises a non-magnetic substrate and a metal thin film magnetic layer formed by an oblique evaporating method on the substrate, the non-magnetic substrate being an aromatic polyamide film. The film has a thickness of 3.0 μm to 6.0 μm, has a Young's modulus in the transverse direction of 16000 MPa to 18000 MPa, and has a thermal contraction coefficient (in the transverse direction; 180° C. for 30 minutes) of 0.7% to 1.3%. With this structure, it has been found that the thermal deformation (cupping) after the thin film is formed can be prevented to improve head touch and the electromagnetic conversion properties.

2 Claims, No Drawings

MAGNETIC RECORDING MEDIUM

BACKGROUND OF THE INVENTION

1. Field of the Invention

The present invention relates to a magnetic recording medium including a ferromagnetic metal thin film. More particularly, the present invention relates to a vapor-deposition-type magnetic recording medium having excellent eletromagnetic conversion properties.

2. Description of the Related Art

Generally, vapor-deposition-type magnetic recording media require no binding agent to bind magnetic materials together, unlike coating-type magnetic recording media. Such a vapor-deposition-type magnetic recording medium has high bulk density, and is suitable for high density recording. Accordingly, the vapor-deposition-type magnetic recording medium has excellent electromagnetic conversion properties, and has been widely utilized. The vapor-deposition-type magnetic recording medium is produced by vacuum vapor deposition of a ferromagnetic metal material, such as Co or Co—Ni, on a non-magnetic substrate such as a biaxially oriented polyethylene terephthalate film, a biaxially oriented polyethylene naphthalate film, a polyimide film, and a polyamide film.

The magnetic materials for the metal thin film magnetic layer include the aforementioned metals or alloys thereof. In particular, the magnetic material including Co has good electromagnetic conversion properties, and is suitable for the high density recording medium. In recent years, there has been a demand for recording with much higher density, and recording media with thinner films have been studied. So, thinner non-magnetic substrate has been studied.

However, the smaller the film thickness of the non-magnetic substrate, the less the tape-shaped magnetic recording medium contacts with a magnetic head (hereinafter referred to as "head touch"). As a result, the output undesirably decreases, especially in a short wavelength area. Furthermore, the magnetic recording medium may have poor traveling durability.

To overcome such problems, an aromatic polyamide film has been used to improve head touch, without decreasing the output, and to improve the operating durability, even if the non-magnetic substrate has a smaller film thickness.

When the aromatic polyamide film is used as the non-magnetic substrate, a decrease in the output and the operating durability, which are caused by insufficient strength of the non-magnetic substrate, are improved. However, the output is still decreased by tape deformation, such as cupping, after the final product is provided.

SUMMARY OF THE INVENTION

The present invention is made to solve the above-mentioned problems. According to the present invention, it has been found that the above-mentioned problems can be solved by setting the Young's modulus in the transverse direction (TD) and the thermal contraction coefficient in the transverse direction within the predetermined ranges.

A magnetic recording medium comprises a non-magnetic substrate, and a metal thin film magnetic layer formed on the substrate by an oblique evaporating method, the non-magnetic substrate being an aromatic polyamide film. The film has a Young's modulus in the transverse direction of 16000 MPa to 18000 MPa, and has a thermal contraction coefficient (which means the contraction coefficient determined by the ratio of the length after heating at 180° C. for 30 minutes and the length before heating; and hereinafter referred to as "thermal contraction coefficient (180° C. for 30 minutes)" or simply "thermal contraction coefficient") of 0.7% to 1.3%. Thermal deformation (cupping) after the thin film is formed can be prevented to improve the head touch and the electromagnetic conversion properties.

If the thermal contraction coefficient in the transverse direction exceeds 1.3%, cupping after thin film formation becomes excessively convex on the vapor deposition side. If the thermal contraction coefficient in the transverse direction is less than 0.7%, the cupping after thin film formation becomes convex on the back coat side. In either case, the head touch becomes worse, and the electromagnetic conversion properties deteriorate. Also, the cupping deteriorates the operating properties, resulting in the decreased durability. From the viewpoint of head touch, it is preferable that the cupping be appropriately convex (about −0.2 mm) on the vapor deposition side. However, if the cupping is excessively convex, it may adversely affect the properties of the magnetic recording medium.

The larger the Young's modulus in the transverse direction, the better the head touch and the electromagnetic conversion property. If the Young's modulus exceeds 18000 MPa, it becomes difficult to control the thermal contraction coefficient in the transverse direction to 1.3% or less. If the Young's modulus is less than 16000 MPa, the thermal contraction coefficient can be easily controlled, but absolute strength lacking, the head touch becomes worse, and the output is decreased.

Conventionally, the recording medium had a smaller thickness for high density recording. In this invention the non-magnetic substrate is also thin and has a thickness of 3.0 $\mu$m to 6.0 $\mu$m. A back coat layer is formed on the substrate at a side opposite to the magnetic layer (evaporated layer), and has a thickness of 0.3 $\mu$m to 0.7 $\mu$m. If the back coat layer has a thickness of less than 0.3 $\mu$m, the cupping is increased on the evaporated side (becomes convex on the back coat side), which leads to deterioration of the head touch. If the back coat layer has a thickness of more than 0.7 $\mu$m, the cupping is increased on the back coat side (becomes convex on the evaporated side), which also leads to deterioration of the head touch. It is therefore preferable that the thickness of the back coat layer be 0.3 $\mu$m to 0.7 $\mu$m, and more preferably 0.4 $\mu$m to 0.6 $\mu$m.

DESCRIPTION OF THE PREFERRED EMBODIMENTS

In the present invention, the aromatic polyamide film is a film comprising an aromatic polyamide resin which is represented by formula (1) or (2) below, or a copolymer of (1) and (2).

(1)

(2)

where $AR_1$, $AR_2$, and $AR_3$ are represented by the following formula (3),

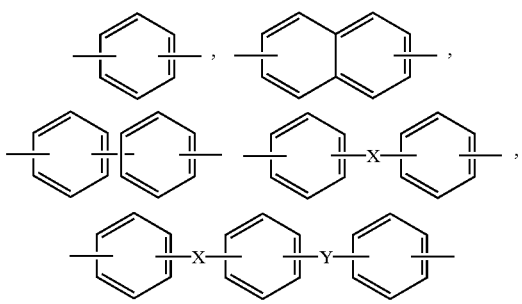

(3)

and X and Y are selected from —O—, —CH$_2$—, —CO—, —SO$_2$—, —S—, —C(CH$_3$)$_2$ and the like, but are not limited thereto.

One or more hydrogen atom in these aromatic rings may be substituted with a halogen group such as fluorine, chlorine, and bromine, preferably chlorine; a nitro group; an alkyl group such as a methyl group, an ethyl group, and a propyl group, preferably a methyl group; or an alkoxy group such as a methoxy group, an ethoxy group, a propoxy group, and an isopropoxy group. One or more of the hydrogen atoms in an amide bond of the polymer may be substituted with another substitutional group.

The polymer has preferably 50% or more, more preferably 75% or more, of the aromatic rings in a para orientation (hereinafter referred to as "para orientation aromatic polyamide") since the film comprising such a polymer has increased stiffness and excellent heat resistance. The para orientation herein means that the bond configuration is linear.

When the content of the aromatic rings in which one or more of the hydrogen atoms is substituted with a halogen group is 30% or more, preferably 50% or more, more preferably 70% or more, moisture resistance is improved, and a change in size due to moisture and a decrease in stiffness are prevented. In addition, when organics and/or inorganics are coated on the aromatic polyamide film, the adhesion between the organic and/or inorganics and the film is improved. Examples of the halogen include fluorine, chlorine, and bromine. Chlorine is especially preferable.

The aromatic polyamide film is produced as follows: an aromatic diamine and an aromatic dicarboxylic acid are polymerized in an organic polar solvent such as N-methylpyrolidone, dimethylacetoamide, and dimethylformamide to synthesize an aromatic polyamide resin. As a neutralizer of the hydrogen chloride produced, an inorganic salt such as calcium hydroxide and calcium carbonate is used. The aromatic polyamide resin is formed into a film by a solution film formation process to produce the aromatic polyamide film.

Examples of the aromatic diamine include paraphenylenediamine, metaphenylenediamine, orthophenyelnediamine, 2-chlorparaphenylenediamine, 4,4'-diaminodiphenylether and the like. Examples of the aromatic dicarboxylic acid include terephthalic acid chloride, 2-chlorterephthalic acid chloride, terephthalic acid hydrazide and the like.

on a surface, on which a magnetic layer is formed, of the non-magnetic substrate, microprotrusions are formed to improve the durability. The microprotrusions are produced by adding inactive fine particles to the aromatic polyamide film, or coating a liquid containing inactive fine particles on the aromatic polyamide film.

The inactive fine particles that become cores of the microprotrusions may be organic particles or inorganic particles. Examples of the organic particles include cross-linked polyvinylbenzene, acrylic polymers, cross-linked polystyrene, polyesters, polyimides, polyamides, fluororesins and the like. Examples of the inorganic particles include colloidal silica, titanium oxide, aluminum oxide, zirconium oxide, calcium carbonate and the like. The average diameter of the particles is preferably 10 to 60 nm, more preferably 20 to 30 nm. The shape of the particles is preferably uniform and spherical. The particles may be used in combination.

The inactive fine particles can be added to the above-mentioned aromatic polyamide film by adding the above-mentioned inorganic particles or organic particles to the aromatic polyamide film, or by coating the liquid containing the inactive fine particles on the aromatic polyester film.

Then, the film is drawn in the longitudinal direction, drawn in the transverse direction, thermally fixed, and relaxed to provide the aromatic polyamide film having the desired thermal contraction coefficient.

The magnetic material for use in the magnetic layer can be a pure metal such as Co and Fe, or an alloy such as Co—Ni, Co—Fe, Co—Cu, Co—Ni—Cr, Co—Pt, Co—Pt—Cr, Co—Cr—Ta, and Co—Ni—B, and is preferably Co or a Co alloy. The magnetic layer is generally formed by vapor depositing such magnetic material directly on the non-magnetic substrate, or vapor depositing Ni on the non-magnetic substrate and then vapor depositing the magnetic material indirectly. Specifically, a vapor deposition chamber is evacuated to about $10^{-6}$ Torr, the magnetic material is fully melted with an electron gun, and the non-magnetic substrate is moved along a cooled main roller to start vapor deposition of the magnetic material. An oxidizing gas selected from oxygen, ozone, and nitrous oxide is introduced into the magnetic layer to control the magnetic properties. A plasma-polymerized hard carbon layer may be disposed on the resultant magnetic layer as required.

The plasma-polymerized hard carbon layer can be obtained as follows: in a chamber (vacuum vessel) including a feed roller, a take up roller, a main roller having electrode plates disposed at a predetermined space with partially cylindrical shapes (cross-section circular arc) for plasma polymerization, and a pass roller as required, a roll-shaped non-magnetic substrate on which the ferromagnetic metal is evaporated is set on the feed roller, the atmosphere is evacuated to a pressure lower than $10^{-5}$ Torr, and a predetermined amount of a hydrocarbon gas and other adding gas(es) is introduced to provide a reaction pressure of 1 to $10^{-2}$ Torr to perform plasma polymerization. The amount introduced is determined depending on the size of the chamber as required.

The hydrocarbon gas is selected from methane, ethane, propane, butane, pentane, hexane, heptane, octane, nonane, ethylene, propylene, acetylene, methylacetylene, and toluene, and can be used alone or in combination.

Examples of the adding gas include hydrogen, neon, helium, argon, oxygen, nitrogen, and the like. The ratio of the adding gas/hydrocarbon is about 1 to 0.01, preferably 0.1 to 0.05. If the amount of the adding gas is more than that of the hydrocarbon, the film forming speed decreases. If the amount of the adding gas is too low, the film cannot be densely produced. A discharge power supply desirably has a frequency of 10 kHz to 450 kHz, especially 50 kHz to 200 kHz. If the frequency is more than 10 kHz, long operation time becomes difficult. If the frequency is less than 450 kHz, the film cannot be densely produced. The frequency of discharge, the reaction pressure, and the flow rate of the reacting gases are desirably controlled so that the plasma-polymerized hard carbon layer has a refractive index of 1.9 or more, preferably about 2.0 to 2.25.

Any known lubricants may be used. Preferably, the lubricant contains fluorine. The lubricant may be represented by R1-A-R2, where R1 is $CF_3(CF_2)_n$—, $CF_3(CF_2)_n(CH_2)_m$—, $CH_3(CH_2)_l$—, or H; A is COO, O, or $COOCH(C_lH_{2l+1})CH_2COO$; and R2 is $CF_3(CF_2)_n$—, $(CF_3(CF_2)_n(CH_2)_m$—, $CH_3(CH_2)_l$—, or H; provided that R1≠R2, n=7 to 17, m=1 to 3, l=7 to 30 are satisfied. R1 and R2 are preferably linear for a suitable lubricating effect. If n is less than 7, water repellency is low. If n exceeds 17, a blocking phenomenon occurs between the lubricant and the non-magnetic substrate or the back coat layer, and friction cannot be reduced. The same applies to l as well as n. The lubricants may be used in combination.

EXAMPLE 1 n-methyl-2-pyrolidone was mixed with 2-chlor paraphenylenediamine at a mol ratio of 0.8 and 4,4'-diaminodiphenylether at a mol ratio of 0.2. The mixture was stirred and dissolved. Terephthalic acid chloride at a mol ratio of 1.0 was added to the mixture and stirred for about 2 hours. Then, lithium hydroxide was added to provide an aromatic polyamide solution.

The aromatic polyamide solution was flowed on a metal belt having a smooth surface with a very small number of defects at a constant speed, and heated and dried at 180° C. for about 2 minutes to form an aromatic polyamide film. The aromatic polyamide film was peeled from the belt, and continuously moved to a water tank at 40° C. to remove impurities on the surface of the film. The film was predried, and heat processed at 280° C. for 1.5 minutes to provide a non-magnetic substrate having a thickness of 4.0 μm. During the heat processing, the film was drawn in the longitudinal and transverse directions so that the physical properties shown in TABLE 1 were obtained.

An aqueous coating liquid containing colloidal silica having a particle diameter of 20 nm was filtered through a filter, coated and dried on the surface of the non-magnetic substrate to provide an aromatic polyamide film having a polymer coating.

On one surface of the aromatic polyamide film having a thickness of 4 μm, two magnetic layers each having a thickness of 1000 Angstrom were formed by Co vapor deposition using an electron gun while introducing oxygen thereinto. On the magnetic layer, ethylene and Ar were introduced at a flow ratio of 2:1, and a predetermined discharge frequency (50 kHz) was applied to form a plasma-polymerized hard carbon layer. On a surface of the hard carbon layer, a predetermined discharge frequency was applied to perform a plasma processing with carbonic acid gas containing oxygen. On the other surface, on which no magnetic layers were formed, of the aromatic polyamide film, a back coat layer having a dry thickness of 0.5 μm was formed by coating a lubricant (a succinic acid derivative $COOHCH(C_{14}H_{29})CH_2COOCH_2CH_2(CF_2)_7CF_3$) using a reverse coating method. The back coat layer was composed of:

- 10 parts by weight (pbw) of carbon black having a particle meter of 80 nm;
- 40 pbw of carbon black having a particle diameter of 20 nm;
- 50 pbw of calcium carbonate having a particle diameter of 70 nm;
- 40 pbw of nitorocellose (Nc) manufactured by Asahi Chemical Industry Co., Ltd. under the trade name of "BTH1/2S";
- 60 pbw of polyurethane resin manufactured by Toyobo Co., Ltd. under the trade name of "UR-8300";
- 800 pbw of methylethylketone;
- 640 pbw of toluene;
- 160 pbw of cyclohexanone: and
- 40 pbw of polyisocyanate (50% non-volatile) manufactured by Nippon Polyurethane Industry Co., Ltd. under the trade name of "CORONATE L".

The resultant aromatic polyamide film was cut to a width of 8 mm to provide a sample. TABLE 1 shows the properties of the thus-obtained magnetic recording medium. To measure the thickness of a plasma-polymerized hard carbon layer, it was also formed on a Si wafer under the same conditions.

EXAMPLES 2 TO 9 AND COMPARATIVE EXAMPLES 1 to 7

In each of the EXAMPLES and COMPARATIVE EXAMPLES, an aromatic polyamide film was obtained by predrying the film as in EXAMPLE 1, heat processing it at 280° C. for 1.5 minutes, and drawing it in the longitudinal and transverse directions under the conditions so that the thermal contraction coefficient and the Young's modulus as shown in TABLE 1 were provided. The film was subjected to the same treatment as EXAMPLE 1 except the above treatments.

On one surface of the thus-obtained aromatic polyamide film having a thickness of 4 μm, two magnetic layers each having a thickness of 1000 Angstrom were formed by Co vapor deposition using an electron gun while introducing Co and oxygen.

Each of the aromatic polyamide film in EXAMPLES and COMPARATIVE EXAMPLES was tested as follows:

Young's Modulus

A test piece having a length of 150 mm and a width of 10 mm was cut from the aromatic polyamide film before the magnetic film was formed. The width was the longitudinal direction of the aromatic polyamide film before cutting. The test piece was subjected to a tensile test using a constant-stretch-type tensile tester at a distance of 100 mm between a chuck and another chuck, and a tensile speed of 5 mm/min. A stress curve was obtained. A tangent was drawn on the rising part of the stress curve. When the elongation of the test piece was 1%, the load at the tangent was determined. The Young's modulus was calculated from the following formula:

$$\text{Young's modulus}=[\text{load}/(\text{width}\times\text{thickness})]\times100$$

Thermal Contraction Coefficient

Three test pieces were prepared as described above except that the length was changed from 150 mm to 100 mm. Reference lines for measuring gap were drawn on the test pieces. The lengths of the test pieces before heating were measured with a microsizer manufactured by Nikon corporation under the trade name "VM-250". The test pieces were heated in a hot air circulating type high temperature bath for a predetermined time, and then taken out. The removed test pieces were allowed to be cooled for 10 minutes. Again, the lengths thereof were measured using the microsizer. Thermal contraction coefficients were calculated using the following formula, and were averaged.

$$\text{Thermal contraction coefficient}=[(\text{length before heating}-\text{length after heating})/\text{length before heating}]\times100$$

The heating condition was at 180±1° C. for 30±1 minutes.

Cupping

Cupping was determined by the maximum height of the tape from an end of the tape. When the tape was convex on the evaporated side, it is denoted by "−". When the tape was convex on the back coat side, it is denoted by "+". In view of the relation to head touch, it is preferable that the cupping be about −0.2, that is, somewhat convex on the vapor deposition side.

Electromagnetic Conversion properties

A 7 MHz signal was recorded and read using a video cassette recorder manufactured by Sony Corporation under the trade name "S1500" to measure the electromagnetic conversion properties. The output values were represented based on the value obtained in COMPARATIVE EXAMPLE 2 as 0 dB.

Head Touch

A waveform produced as a result of the tape reading was observed with a digital oscilloscope manufactured by Lecroy Corp. When the output signal was normal, it is denoted by "very good". When the output signal was somewhat distorted, it is denoted by "good". When the waveform was distorted significantly, and the output was decreased significantly, it is denoted by "bad".

TABLE 1

Young's modulus and thermal contraction coefficient of non-magnetic substrate, and various properties of magnetic recording medium comprising the substrate

| | Young's modulus (Transverse direction) (MPa) | Thermal contraction coefficient (Transverse direction) (%) | Cupping (mm) | Output (dB) | Head touch |
|---|---|---|---|---|---|
| Ex. 1 | 17000 | 1.0 | −0.1 | +0.6 | Very good |
| Ex. 2 | 17000 | 0.7 | +0.1 | +1.0 | Very good |
| Ex. 3 | 17000 | 1.3 | −0.3 | +1.1 | Very good |
| Ex. 4 | 18000 | 1.0 | −0.2 | +0.7 | Very good |
| Ex. 5 | 18000 | 0.7 | 0.0 | +1.4 | Very good |
| Ex. 6 | 18000 | 1.3 | −0.4 | +1.5 | Good |
| Ex. 7 | 16000 | 1.0 | 0.0 | +0.4 | Good |
| Ex. 8 | 16000 | 0.7 | +0.2 | +0.6 | Good |
| Ex. 9 | 16000 | 1.3 | −0.2 | +0.5 | Good |
| Comp. Ex. 1 | 19000 | 1.3 | −0.6 | −0.8 | Bad |
| Comp. Ex. 2 | 16000 | 0.6 | +0.3 | 0.0 | Bad |
| Comp. Ex. 3 | 15000 | 0.6 | +0.4 | −0.6 | Bad |
| Comp. Ex. 4 | 15000 | 0.7 | +0.3 | −0.2 | Bad |
| Comp. Ex. 5 | 15000 | 1.0 | +0.1 | 0.0 | Bad |
| Comp. Ex. 6 | 15000 | 1.3 | −0.1 | 0.0 | Bad |
| Comp. Ex. 7 | 15000 | 1.4 | −0.2 | −0.4 | Bad |

As is apparent from TABLE 1, the magnetic recording media comprising the non-magnetic substrate having a Young's modulus in the transverse direction of 16000 MPa to 18000 MPa and a thermal contraction coefficient in the transverse direction of 0.7% to 1.3% provide certain degree of outputs and normal, good wave forms upon reading when the electromagnetic conversion properties are evaluated with the output.

Advantages of the Invention

According to the present invention, the magnetic recording medium comprising the non-magnetic substrate, the metal thin film magnetic layer, the plasma-polymerized hard carbon layer, and the lubricant has significantly improved thermal deformation (cupping) and operating durability, and has excellent electromagnetic conversion properties.

What is claimed is:

1. A magnetic recording medium comprising:

a non-magnetic substrate;

a metal thin film magnetic layer formed on the substrate by an oblique vapor evaporating method;

a plasma-polymerized carbon layer on the magnetic layer;

a lubricant on the carbon layer; and a back coat layer with a thickness of 0.3 μm to 0.7 μm on a side opposite to the magnetic layer of the substrate, wherein the non-magnetic substrate is an aromatic polyamide film, wherein the film has a Young's modulus in the transverse direction of 16000 MPa to 18000 MPa, and has a thermal contraction coefficient of 0.7% to 1.3%, and wherein the lubricant is represented by R1-A-R2, where R1 is $CF_3(CF_2)_n-$, $CF_3(CF_2)_n(CH_2)_m-$, $CH_3(CH_2)_l-$, or H; A is $COOCH(C_lH_{2l+1})CH_2COO$, and R2 is $CF_3(CF_2)_n-$, $CF_3(CF_2)_n(CH_2)_m-$, $CH_3(CH_2)_l-$, or H; provided that R1 noteq R2, n=7 to 17, m=1 to 3, and l=7 to 30.

2. A magnetic recording medium according to claim 1, wherein the non-magnetic substrate has a thickness of 3.0 μm to 6.0 μm.

* * * * *